Patented Nov. 19, 1929

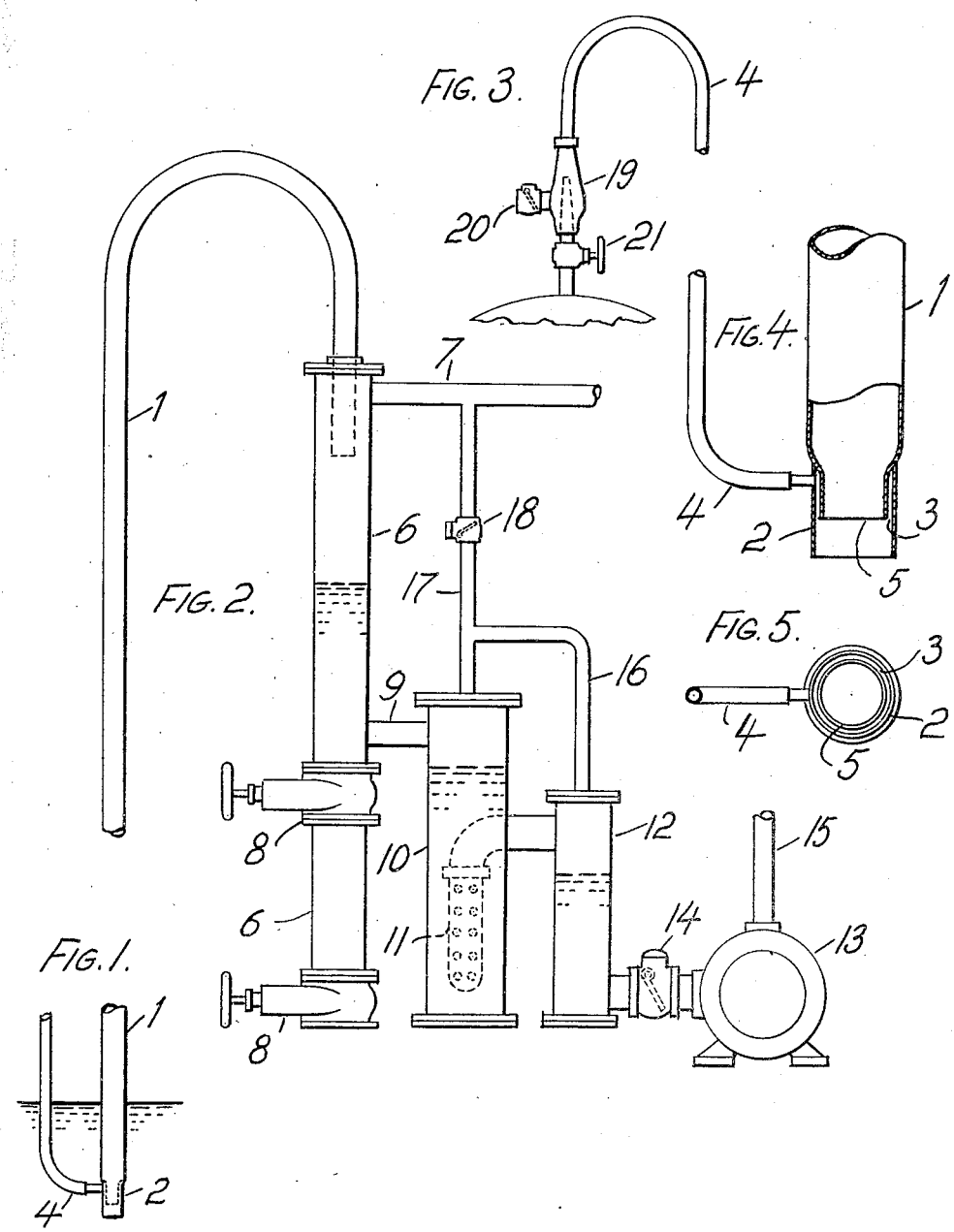

1,736,620

UNITED STATES PATENT OFFICE

BENGT OLSSON, OF BROOKLYN, NEW YORK, ASSIGNOR, BY MESNE ASSIGNMENTS, TO SALVAGE PROCESS CORPORATION, OF NEW YORK, N. Y., A CORPORATION OF NEW YORK

OIL-PUMPING APPARATUS

Application filed February 2, 1926. Serial No. 85,523.

My invention provides an apparatus adapted to pump viscous material like oils, molasses and heavy sludge by means of vacuum suction through transmission lines of considerable length and elevation.

The invention has for its object to provide a vacuum suction line at the end of which air is admitted through an annular air space.

The invention has also for its object to provide a vacuum chamber of small volumetric content at the discharge end of the section line from which chamber the air is evacuated by means of a vacuum pump or convenient air exhauster.

The invention has further for an object to provide suction means for the withdrawal of the pumped material from said vacuum chamber.

The invention also provides straining and priming vacuum chambers through which the pumped material is sucked prior to its admittance to the discharge pump.

My invention finally has for an object to provide means for the admittance of steam to the suction end when very viscous materials are handled.

In the drawing:—

Figure 1 shows the suction end of the apparatus submerged in the material to be pumped.

Figure 2 shows the detail arrangement of the pumping apparatus.

Figure 3 shows a combined air and steam injector.

Figures 4 and 5 show the detail arrangement of the annular air inlet at the suction end of the transmission line on an enlarged scale.

Referring to the drawing in which like reference characters designate corresponding parts, 1 represents the suction transmission line the intake end 2 of which has a diameter slightly smaller than the line proper.

Inside the intake end is the annular air space 3 to which the air is admitted through line 4 the air escaping below the annular partition 5 which terminates a short distance above the end of the intake.

The line 1 terminates inside the pipe chamber 6 which at its top is connected to the vacuum line 7.

The chamber 6 is provided with two gate valves 8.

The pipe 9 allows for the withdrawal of the material from chamber 6 into the suction strainer chamber 10 from which chamber the pumped material is sucked through the strainer 11 into the priming chamber 12 which is directly connected to the discharge pump 13, which latter is supplied with the check valve 14 and discharge pipe 15.

The chambers 10 and 12 are connected together by the equalizing pipe 16, which pipe also is connected to the suction line 1 by the booster line 17 supplied with check valve 18.

The air line 4 is connected to the steam air injector 19 which is provided with an air inlet non-return valve 20 and the regulating valve 21 is placed close to the steam supply.

The action of the apparatus is as follows:—

When the discharge pump 13 has been started and the vacuum has been applied in the suction line by any suitable means (not shown) the intake end 2 is submerged into the material to be pumped.

The regulating valve 21 having been properly set admits the steam into the injector 19 and air is sucked through valve 20 and forced through the pipe line 4 into the annular space 3 from which the air now thoroughly heated by the steam, escapes into the suction line 1 under the partition 5.

It is to be noted that the air in entering the suction line proper has a downwards velocity directly opposite to the velocity imparted by suction to the pumped material. In this way the air will be discharged from the nozzle and a considerably less amount pass into the suction hose when the momentum of the sucked up material fills the suction line in the form of a solid column.

The vacuum in the suction line 1 however builds up rapidly when the air admittance is cut off by the column of material within the suction line and the column will snap at the annular air admittance.

The vacuum will now cause the column or piston slug to move upwards in the pipe line 1 and as the vacuum keeps on increasing in front of the piston the speed of the slug will increase. The slug will thus enter the chamber 6 with a great velocity and as the air supply is so regulated that sufficient air will fill in behind the slug the vacuum will be suddenly lowered on chamber 6 when the slug is discharged therein.

As the suction pipe from the chamber 6 is located above the gate valves 8 it is possible to pump when either valve is closed.

Therefore the upper valve can be closed and the lower valve can be opened simultaneously during pumping.

All material heavier than the liquid pumped will fall to the bottom of the chamber 6 whereupon it can be conveniently removed without interruption of pumping by proper manipulation of the valves 8.

The pumped material will upon entering chamber 6 accumulate in the bottom of the chamber until it seals the pipe 9.

A vacuum higher than the average vacuum in the chamber 6 will then be created in the chambers 10 and 12.

When the vacuum in chamber 6 is higher than that in chambers 10 and 12 the air will be sucked out from these chambers through the valve 18, but when the vacuum is lower in said chambers the valve 18 will prevent any vacuum reduction in these chambers. As the pump (not shown) which is connected to the vacuum line 7, is working in opposition to the pump 13, it is obvious that the vessels 6, 10 and 12 are subjected to opposed suctions. Due to my arrangement, the vacuum in line 7 will cause the material passing through the suction line 1, to deposit in the chamber 6, from which it overflows through the pipe 9, into the chamber 10. From the latter, the material overflows through the screen 11, and the pipe to which it is connected, into the chamber 12. Due to this arrangement, liquid seals are formed between the pipe containing the valve 14, and the vessel 6, so that the operation of the pump 13 will not affect the vacuum created in the vessel 6. The material, after it reaches the vessel 10, may still contain foreign bodies like rags and sticks which are lighter than the liquid pumped, and the object of the strainer is to prevent such bodies from entering the priming chamber 12.

It is to be noted that the equalizing pipe 16 equalizes the vacuum in the two chambers 10 and 12 so that the transfer from 10 to 12 is by gravity alone.

In this way there is no danger for sticks and rags to jam into the strainer openings.

When the strainer has been clogged so that pumping is interfered with the chamber is opened at the bottom and the clogging matter is removed.

From the priming chamber the liquid material now free from unpumpable matter is sucked to the pump 13 and discharged through the line 15.

I do not wish to be understood as limiting myself to the specific details of construction as it is manifest that variations and modifications may be made in the adoption of the device to various conditions without departing from the spirit and scope of my invention.

I claim :—

1. In a vacuum pumping apparatus, the combination with suction chambers, of an open ended suction line connected with one of said chambers, means for injecting steam and air to the suction line near its open end, vacuum line connections between the chambers above the liquid levels maintained therein, liquid communicating lines between the chambers, and a liquid discharge pump having its suction line connected to the chamber other than that to which the suction line is connected.

2. A vacuum pumping apparatus, including a suction line, a suction chamber connected to said line, and provided with air removal means, a suction tank connected to said chamber and provided with a sealed inlet from said chamber, a discharge pump, and a priming pump chamber connected to the discharge pump and having connections with the suction chamber above and below the liquid level maintained therein.

BENGT OLSSON.